(12) United States Patent
Mani et al.

(10) Patent No.: US 9,938,385 B2
(45) Date of Patent: Apr. 10, 2018

(54) FILM AND METHOD FOR PRODUCING SAME

(71) Applicant: Benecke-Kaliko AG, Hannover (DE)

(72) Inventors: Joseph Mani, Eislingen (DE); Volker Hülsewede, Schlat (DE); Thomas Malner, Göppingen (DE); Jürgen Bühring, Wedemark (DE)

(73) Assignee: Benecke-Kaliko AG, Hannover (DE)

( * ) Notice: Subject to any disclaimer, the term of this patent is extended or adjusted under 35 U.S.C. 154(b) by 88 days.

(21) Appl. No.: 15/021,309

(22) PCT Filed: Jul. 15, 2014

(86) PCT No.: PCT/EP2014/065062
§ 371 (c)(1),
(2) Date: Mar. 11, 2016

(87) PCT Pub. No.: WO2015/036148
PCT Pub. Date: Mar. 19, 2015

(65) Prior Publication Data
US 2016/0222176 A1  Aug. 4, 2016

(30) Foreign Application Priority Data
Sep. 12, 2013 (DE) .................. 10 2013 110 036

(51) Int. Cl.
| | |
|---|---|
| *C08J 5/18* | (2006.01) |
| *B29C 71/04* | (2006.01) |
| *B29C 51/00* | (2006.01) |
| *C08J 3/28* | (2006.01) |
| *C08L 23/08* | (2006.01) |
| *C08L 23/12* | (2006.01) |
| *C08J 3/24* | (2006.01) |
| *B29C 59/00* | (2006.01) |
| *C08L 23/06* | (2006.01) |
| *B29C 35/08* | (2006.01) |
| *B29C 51/02* | (2006.01) |
| *B29K 23/00* | (2006.01) |
| *B29K 105/00* | (2006.01) |
| *B29L 31/30* | (2006.01) |

(52) U.S. Cl.
CPC ................ *C08J 5/18* (2013.01); *B29C 35/08* (2013.01); *B29C 51/002* (2013.01); *B29C 59/005* (2013.01); *B29C 71/04* (2013.01); *C08J 3/24* (2013.01); *C08J 3/28* (2013.01); *C08L 23/06* (2013.01); *C08L 23/0815* (2013.01); *C08L 23/12* (2013.01); *B29C 51/02* (2013.01); *B29C 2035/0877* (2013.01); *B29K 2023/06* (2013.01); *B29K 2023/12* (2013.01); *B29K 2105/0094* (2013.01); *B29K 2105/256* (2013.01); *B29K 2995/004* (2013.01); *B29L 2031/3041* (2013.01); *C08J 2323/06* (2013.01); *C08J 2323/08* (2013.01); *C08J 2323/12* (2013.01); *C08J 2423/08* (2013.01); *C08J 2423/12* (2013.01)

(58) Field of Classification Search
CPC ......... C08J 5/18; C08J 3/24; C08J 3/28; C08J 2323/06; C08J 2323/12; C08J 2423/08; C08J 2423/12; B29C 35/08; B29C 51/002; B29C 59/005; B29C 71/04; B29C 51/02; B29C 2035/0877; B29C 2105/0094; B29C 2105/256; B29C 2995/004; C08L 23/06; C08L 23/0815; C08L 23/12; B29K 2023/06; B29K 2023/12; B29K 2105/0094; B29K 2105/256; B29K 2995/004
See application file for complete search history.

(56) References Cited

U.S. PATENT DOCUMENTS

| | | | | |
|---|---|---|---|---|
| 2009/0105397 A1* | 4/2009 | Van Riel et al. | ..... | C08F 297/08 524/505 |
| 2012/0088868 A1* | 4/2012 | Worku et al. | ........... | C08L 23/12 524/101 |
| 2015/0368449 A1* | 12/2015 | Kastner et al. | ......... | C08L 23/10 521/134 |

FOREIGN PATENT DOCUMENTS

| | | |
|---|---|---|
| DE | 10 2011 053224 A1 | 3/2013 |
| EP | 0326408 A2 | 8/1989 |
| EP | 2 263 856 A1 | 12/2010 |

OTHER PUBLICATIONS

Yuri Kissin: "Alkene Polymerization Reactions with Transition Metal Catalysts", Mar. 10, 2008 (p. 32 and 33).

* cited by examiner

*Primary Examiner* — Nathan M Nutter
(74) *Attorney, Agent, or Firm* — David L. Cate

(57) ABSTRACT

A film including a top ply, where at least the top ply contains 15 to 90 phr of at least one ethylene-based polymer having a Mooney viscosity (ML1+4, 121° C.) of 50 to 80 Mooney units and 10 to 85 phr of at least one polypropylene having an ISO 178 flexural modulus of greater than or equal to 400 MPa, and the film may be a single-ply or multi-ply film. In some aspects the ethylene-based polymer has a crystallinity of less than or equal to 30%. The top ply may further include at least one compatibilizer, which has, in some cases, a melt flow index MFI (230° C., 2.16 kg) of 0.1 to 4.0 g/10 min.

9 Claims, No Drawings

FILM AND METHOD FOR PRODUCING SAME

CROSS REFERENCE TO RELATED APPLICATIONS

This application is a continuation application of international patent application PCT/EP2014/065062, filed Jul. 15, 2014, designating the United States and claiming priority from German application 10 2013 110 036.8, filed Sep. 12, 2013, and the entire content of these applications is incorporated herein by reference.

FIELD OF THE INVENTION

The invention relates to a film and to a method for its production. This film may be single-ply or multi-ply and is used in particular for automotive interior trim.

BACKGROUND

This section provides background information to facilitate a better understanding of the various aspects of the disclosure. It should be understood that the statements in this section of this document are to be read in this light, and not as admissions of prior art.

Films and film laminates, i.e., multilayer films, based on polyvinyl chloride (PVC) or on thermoplastic polyolefins (TPO) or on polyurethanes (PU or PUR), are already well known from the prior art. They are used across a wide variety of different sectors, in the packaging industry, for example, or in the automobile sector. For use in the different sectors, particularly in the sector of automotive interior trim, the films or film laminates are further-processed by thermoforming operations or other deforming operations in order to obtain the desired form—for example; an automotive interior trim form. Exacting requirements are imposed on the films or film laminates in terms of their chemical and physical properties; for instance, grained films in particular are to have good grain stability and at the same time good scratch resistance. EP 1149858 A1 provides improved grain stability to a TPO film, for example, using electron beams. EP 1688460 B1 discloses a TPO film which in fact already has good grain stability but whose scratch resistance is inadequate. TPO films for the automobile interior typically exhibit much lower scratch resistance by comparison with PVC or PU films.

At the same time, attaining a gloss level of less than 1.5 after thermoforming is desirable, in order to achieve high-grade optical qualities for the film and to minimize reflections in windshields, for example. Reducing the gloss level is accomplished by introduction of a defined surface roughness and of the diffuse light scattering which this produces. The surface roughness is introduced in different lengthwise scaling. In general, the coarsest roughness with optical effect is introduced via the graining. The introduction of a finer roughness is accomplished usually by means of matting agents in the coating layer. Both measures together have, however, hitherto proven not to be enough to attain 1.5 gloss units after thermoforming. It is necessary, furthermore, for the film formula to exhibit a very fine surface roughness by virtue of its morphology. The contribution to roughness through the morphology of the film formula can be determined, independently of the graining and coating, directly on the thermoformed extruded specimen. Only if the extruded thermoformed specimen has a low gloss level can the coated grained component be expected to exhibit the required gloss level.

SUMMARY

This section provides a general summary of the disclosure, and is not a necessarily a comprehensive disclosure of its full scope or all of its features.

In a first embodiment of the disclosure, a film is provided which includes a top ply, where at least the top ply contains 15 to 90 phr of at least one ethylene-based polymer having a Mooney viscosity (ML1+4, 121° C.) of 50 to 80 Mooney units and 10 to 85 phr of at least one polypropylene having an ISO 178 flexural modulus of greater than or equal to 400 MPa, and the film may be a single-ply or multi-ply film. In some aspects the ethylene-based polymer has a crystallinity of less than or equal to 30%. The top ply may further include at least one compatibilizer, which has, in some cases, a melt flow index MFI (230° C., 2.16 kg) of 0.1 to 4.0 g/10 min.

Some other embodiments are methods for producing the film described above, where the film is further processed to a component by means of an IMG process at a temperature of greater than 160° C.

In yet other embodiments, methods for producing the use a positive thermoforming process with at least one grain structure-forming embossing cut and subsequent crosslinking. In some aspects, after the grain structure-forming embossing step and the crosslinking, the film has a gel content of 10 to 80 wt %, measured after 24-hour extraction in boiling xylene, and the crosslinking may take place by means of electron beam crosslinking.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, or refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or an are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

One objective of the invention is to provide a single-layer or multilayer TPO film which is distinguished by good scratch resistance and a sufficient gloss level. The film is to be able to be processed in a positive thermoforming operation and to exhibit good grain reproduction and formation of the component geometry in a negative thermoforming process or in an IMG process. In the case of the IMG process (In-Mold Graining process), by comparison with the conventional laminating operation, in which a grained film is vacuum-laminated out of a base component, grain application takes place immediately prior to the laminating operation. This is accomplished by a mold which already contains the grain structure and which transfers this structure to the hot film. In this preformed state, this grained film is applied directly to the base component. In the case of the positive thermoforming process, the film is provided with a grain at the lamination stage itself, in other words by means of a prior embossing procedure with a three-dimensional surface structure. This grain may be altered, owing to the stretching of the film during the thermoforming operation, only in such a way that the optical qualities of the final component correspond to the requirements of the customer. In order to achieve this stability it is known practice to crosslink the film prior to thermoforming, by means of electron beams. The crosslinking operation may be supported by addition of crosslinking assistant.

The resistance of the surfaces to scratching articles is increasingly acquiring significance. The scratch resistance is tested according to Erichsen 318 with a needle diameter of 0.75 mm and, for a leatherlike grain with a grain depth at 300 µm, is to have at least 3N scratch resistance or more. A further boundary condition is a low level of gloss on the component.

The object is achieved by means of a single-ply or multi-ply film, in which at least the top ply comprises 15 to 90 phr of at least one ethylene-based polymer having a Mooney viscosity (ML1+4, 121° C.) of 50 to 80 Mooney units and 10 to 85 phr of at least one polypropylene having an ISO 178 flexural modulus of greater than or equal to 400 MPa.

A film of this kind is able, surprisingly, to be processed in a positive thermoforming process, and exhibits a distinct scratch resistance in tandem with continued good grain stability. At the same time there is effective reproduction of the grain and formation of the component geometry in the IMG process.

The ethylene-based polymer is referred to here as the soft phase and has a Mooney viscosity (ML1+4, 121° C.) of 50 to 80 Mooney units (MU), preferably of 54 to 70 Mooney units. The Mooney viscosity is determined in accordance with ASTM D1646. The Mooney viscosity can be adjusted by way of a high degree of branching of the polymers and/or a high molecular weight. The ethylene-based polymer is used in amounts of 15 to 90 phr, preferably in amounts of 50 to 70 phr.

In one particularly preferred embodiment, the crystallinity of the ethylene-based polymer is less than or equal to 30%, preferably less than or equal to 20%. The crystallinity is determined by means of DSC in accordance with ISO 11357-1:2009.

The ethylene-based polymer has at least 50 wt % of ethylene units and a density of less than 0.90 g/cm$^3$.

Examples of soft, ethylene-based polymers which can be used include ethylene-based copolymers and/or ethylene-propylene copolymers (PEP) and/or ethylene-propylene rubber (EPR), EPM rubber, EPDM rubber and/or polyethylenes.

The polypropylene present in accordance with the invention is here termed the hard phase. It is notable for a flexural modulus of greater than or equal to 400 MPa, preferably of greater than or equal to 800 MPa, more preferably of greater than or equal to 1200 MPa. The polypropylene is used in amounts of 10 to 85 phr, preferably in amounts of 30 to 50 phr. Polypropylene which can be used embraces all of the polypropylenes in the art, such as, for example, PP homo (polypropylene, homopolymer), PP copo (polypropylene, copolymer), PP random (polypropylene), RAHECO (random heterophase copolymers), and PP compounds.

In one particularly preferred embodiment, the ply of the film further comprises at least one compatibilizer, particularly when using PP homo. The polypropylene, especially the PP homo, here customarily forms the disperse phase, while the ethylene-based polymer forms the continuous matrix. The miscibility and the size of the resultant phases are determined by interactions between the polymers and also by the addition of compatibilizers. Compatibilizer used here is preferably PP random and/or PE-PP copolymer, which attach at the phase interface. As a result, good mechanical and chemical properties can be obtained. When at least one ethylene-propylene copolymer is used, the ethylene fraction ought preferably to be between 1 and 10 wt %, more preferably between 3 and 5 wt %.

The compatibilizer preferably has a melt flow index MFI (230° C., 2.16 kg) of 0.1 to 4.0 g/10 min, more preferably of 0.2 to 1.0 g/10 min, very preferably of 0.3 to 0.5 g/10 min.

In general there is no need for a compatibilizer when using PP random as hard phase.

Besides the polymer constituents, the composition used for film production may preferably comprise a series of assistants, such as crosslinking assistants, antioxidants, light stabilizers, pigments, lubricants and/or aging inhibitors.

It has proven particularly advantageous for antioxidants used to comprise phenol derivatives, lactones and/or phosphites, and for light stabilizers used to comprise sterically hindered amines or benzotriazines, in an amount of less than about 5 wt %, preferably up to 3.5 wt %, more particularly from 0.2 to 2.5 wt %, based on the weight of the composition.

In order to obtain good grain stability of the film in the case of positive thermoforming, it is an advantage if the top ply of the single-ply or multi-ply film, after the grain structure-forming embossing step and the crosslinking within the positive thermoforming process, has a gel content of 10 to 80 wt %, preferably of 25 to 50 wt %, measured after 24-hour extraction in boiling xylene. Films having a gel content of this kind can be thermoformed and/or otherwise deformed without substantial alteration or impairment of the grain structure.

After the embossing there is a further crosslinking of the material for high grain stability during thermoforming and/or deforming. The further crosslinking that takes place after the grain structure-forming embossing step may take place by chemical means or physically.

In the case of physical crosslinking, it has proven advantageous if the further crosslinking is accomplished by means of electron beams. This produces particularly good distribution of the network nodes, which are important for effective grain retention and for uniform stretching of the film on the component after thermoforming. In the case of compact films, irradiation here takes place preferably with an irradiation dose of 10 to 300 kGy, more particularly 30 to 150 kGy; in the case of film laminates, with an irradiation dose of 20 to 150 kGy, more particularly 30 to 100 kGy.

For the use of the film in the negative thermoforming process or in the IMG process, there is initially no need for crosslinking by electron beams. Here, first of all, the film is laminated without embossing. In order to achieve good grain reproduction in the IMG process, a sufficient low melt viscosity of the film under the conditions relevant for the graining operation is an advantage. In the IMG operation, the film is deformed and grained preferably at a temperature of greater than 160° C. The grain introduced in the IMG operation must remain stable on the component on hot storage at 120° C. over a period of at least three weeks.

During the and/or before the and/or after the grain structure-forming embossing step and/or before and/or after the crosslinking, the film may be laminated to give a multi-ply composite structure and/or coated, with a PUR varnish, for example, and subsequently to the further crosslinking it may be thermoformed to give a multi-ply, grained molding, as for example a motor vehicle interior trim component.

If the film is of multi-ply design, in the form of a composite structure or film laminate, the ply which comprises the composition of the invention forms the top ply, which is referred to as top film or upper film. The multi-ply film therefore consists at least of a top film according to the invention, and of a bottom film. The bottom film may be compact or foamed and/or may comprise a textile.

The multi-ply film may be provided with a backing, of ABS or natural fibers, for example, in which case it is an advantage if the backing is joined to the grained, multi-ply film laminate directly during the thermoforming operation in the production of the grained, multi-ply film. Backing and bottom film may be joined here by way of an adhesive system.

The invention is now illustrated using working examples. For this purpose, thermoformed, grained moldings were produced as described hereinafter.

The compositions formulated in tables 1 and 2 below, with the amounts of the substances in parts by weight, were extruded on a twin-screw extruder to form films with a thickness of 0.5 mm. The quantity figures for the individual constituents are reported in accordance with the phr (parts per hundred parts of rubber) quantity figure used customarily within the rubber industry.

The gel content was determined according to the following method:

The gel contents were obtained by the extraction method. The samples were cut into strips approximately 1 mm in size and were weighed out to an accuracy of 0.1 g±0.01 g onto a mesh of known net weight. The mesh is folded so that the strips are enclosed in the mesh. Each mesh is then introduced into a test tube. To each test tube, 50 mL of xylene are added. In order to prevent the sample floating, steel meshes are suspended into the tube, ensuring complete immersion into the xylene. The samples are sealed with aluminum foil and placed for 16 hours into an oil bath preheated to 145° C. The test tubes are subsequently removed from the oil bath.

The meshes are each placed on an aluminum tray and dried in a drying cabinet at 150° C. for five hours. After cooling to room temperature, they are reweighed together with the aluminum trays, for which it is also necessary here to know the net weight of the individual aluminum tray.

Determination of the gloss after extrusion in table 2 is accomplished here at an angle of 60° using a Byk Gardner Mikro Gloss instrument. Determination of the gloss after thermoforming in table 2 is accomplished here with stretching of 60% to 100% in uncoated form at an angle of 60° using a Byk Gardner Mikro Gloss instrument.

Table 1 describes films produced by means of a positive thermoforming process. Table 2 describes films which can be further-processed by means of an IMG process.

"C" labels comparative examples in each case, whereas the examples labeled "I" are in each case inventive.

The inventive examples I1 to I4 each exhibit outstanding scratch resistance.

TABLE 1

| Film compositions for positive thermoforming applications | | | | | |
|---|---|---|---|---|---|
| Substance | C1 | C2 | C3 | I1 | I2 |
| TPE-V blend | 60 | — | — | — | — |
| PE 1 | 20 | 60 | — | — | — |
| PE 2 | — | — | 60 | 60 | — |
| PE 3 | — | — | — | — | 60 |
| PP 1 | 20 | 35 | — | 35 | 35 |
| PP 2 | — | 5 | — | 5 | 5 |
| PP/EPM blend | — | — | 40 | — | — |
| UV light stabilizer | 0.2 | 0.2 | 0.2 | 0.2 | 0.2 |
| Antioxidant | 0.3 | 0.3 | 0.3 | 0.3 | 0.3 |
| Carbon black | 2.0 | 2.0 | 2.0 | 2.0 | 2.0 |
| Extrusion behavior | Ok | Ok | Ok | Ok | Ok |
| MFI (230° C./ 2.16 kg) | 1.8 g/ 10 min | 1.0 g/ 10 min | 0.8 g/ 10 min | 0.9 g/ 10 min | 0.8 g/ 10 min |
| Embossing rate | 6 m/ min | 6 m/ min | 6 m/ min | 6 m/ min | 6 m/ min |
| Crosslinking dose [kGy] | 75 | 75 | 75 | 75 | 75 |
| Gel content of film at time of embossing step | 18% | <2% | <2% | <2% | <2% |
| Gel content of film at time of thermoforming | 18% | 35% | 32% | 30% | 40% |

TABLE 1-continued

Film compositions for positive thermoforming applications

| Substance | C1 | C2 | C3 | I1 | I2 |
|---|---|---|---|---|---|
| Thermoforming $T_{face}$ = 170° C. $T_{reverse}$ = 180° C. | Flattened grain, glossing | Well-developed grain, no glossing | Well-developed grain, no glossing | Well-developed grain, no glossing | Well-developed grain, no glossing |
| Scratch resistance | 2N | 2N | 2N | 4N | 5N |

TPE-V blend: thermoplastic elastomer consist of 35 wt % PP and 65 wt % of EPM, MFI 15 g/10 min (230° C./10 kg), gel content 28%
PE 1: ethylene-butene copolymer, Mooney viscosity ML [121° C. 1 + 4]: 47 MU, softening point about 50° C.
PE 2: ethylene-butene copolymer, Mooney viscosity ML [121° C. 1 + 4]: 54 MU, softening point about 50° C.
PE 3: EPDM, ENB fraction 4.9%, Mooney viscosity ML [121° C. 1 + 4]: 70 MU, softening point about 50° C.
PP 1: homo-PP, flexural modulus = 1200 MPa, MFI = 2.6 g/10 min at 230° C.; 2.16 kg; melting point = 164° C.
PP 2: r-PP, flexural modulus = 800 MPa, MFI = 0.3 g/10 min at 230° C.; 2.16 kg; melting point = 143° C.
PP/EPM blend: 20 wt % h-PP and 80 wt % EPM, flexural modulus = 380 MPa, MFI 0.8 g/10 min (230° C./2.16 kg), softening point about 140° C.
Light stabilizer: benzotriazole derivative
Antioxidant: sterically hindered phenol

TABLE 2

Film compositions for IMG applications

| Substance | C4 | C5 | C6 | I3 | I4 |
|---|---|---|---|---|---|
| TPE-V blend | 60 | — | — | — | — |
| PE 1 | 20 | 60 | — | — | — |
| PE 2 | — | — | 60 | 60 | — |
| PE 3 | — | — | — | — | 60 |
| PP 1 | 20 | 35 | — | 35 | 35 |
| PP 2 | — | 5 | — | 5 | 5 |
| PP/EPM blend | — | — | 40 | — | — |
| UV light stabilizer | 0.2 | 0.2 | 0.2 | 0.2 | 0.2 |
| Antioxidant | 0.3 | 0.3 | 0.3 | 0.3 | 0.3 |
| Carbon black | 2.0 | 2.0 | 2.0 | 2.0 | 2.0 |
| Extrusion behavior | Ok | Ok | Ok | Ok | Ok |
| MFI (230° C./2.16 kg) | 1.8 g/10 min | 1.0 g/10 min | 0.8 g/10 min | 0.9 g/10 min | 0.8 g/10 min |
| Scratch resistance | 2N | 2N | 2N | 4N | 5N |
| Gloss after extrusion | 4.6 | 3.2 | 2.1 | 2.0 | 1.9 |
| Gloss after thermoforming | 1.9 | 2.0 | 1.6 | 1.4 | 1.3 |

TPE-V blend; thermoplastic elastomer consist of 35 wt % PP and 65 wt % of EPM, MFI 15 g/10 min (230° C./10 kg), gel content 28%
PE 1: ethylene-butene copolymer, Mooney viscosity ML [121° C. 1 + 4]: 47 MU, softening point about 50° C.
PE 2: ethylene-butene copolymer, Mooney viscosity ML [121° C. 1 + 4]: 54 MU, softening point about 50° C.
PE 3: EPDM, ENB fraction 4.9%, Mooney viscosity ML [121° C. 1 + 4]: 70 MU, softening point about 50° C.
PP 1: homo-PP, flexural modulus = 1200 MPa, MFI = 2.6 g/10 min at 230° C.; 2.16 kg; melting point = 164° C.
PP 2: r-PP, flexural modulus = 800 MPa, MFI = 0.3 g/10 min at 230° C.; 2.16 kg; melting point = 143° C.
PP/EPM blend: 20 wt % h-PP and 80 wt % EPM, flexural modulus = 380 MPa, MFI 0.8 g/10 min (230° C./2.16 kg), softening point about 140° C.
Light stabilizer: benzotriazole derivative
Antioxidant: sterically hindered phenol The foregoing description of the embodiments has been provided for purposes of illustration and description. Example embodiments are provided so that this disclosure will be sufficiently thorough, and will convey the scope to those who are skilled in the art. Numerous specific details are set forth such as examples to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. A film comprising a top ply, wherein at least the top ply comprises 15 to 90 phr of at least one ethylene-based polymer having a Mooney viscosity (ML1+4, 121° C.) of 50 to 80 Mooney units and 10 to 85 phr of at least one polypropylene having an ISO 178 flexural modulus of greater than or equal to 400 MPa, wherein the film is a single-ply or multi-ply film, and wherein the film has a scratch resistance of from 2N to 5N.

2. The film of claim 1, wherein the ethylene-based polymer has a crystallinity of less than or equal to 30%.

3. The film of claim 1, wherein the top ply further comprises at least one compatibilizer.

4. The film of claim 3, wherein the compatibilizer has a melt flow index MFI (230° C., 2.16 kg) of 0.1 to 4.0 g/10 min.

5. A method for producing the film of claim 1, wherein the film is further processed to a component by means of an IMG process at a temperature of greater than 160° C.

6. A method for producing the film of claim 1, wherein the film is produced in a positive thermoforming process with at least one grain structure-forming embossing cut and subsequent crosslinking.

7. The method of claim 6, wherein after the grain structure-forming embossing step and the crosslinking, the film has a gel content of 10 to 80 wt %, measured after 24-hour extraction in boiling xylene.

8. The method of claim 6, wherein the crosslinking takes place by means of electron beam crosslinking.

9. The film of claim 1, as used as an interior trim of a motor vehicle.

* * * * *